US012017223B2

(12) United States Patent
Walton et al.

(10) Patent No.: US 12,017,223 B2
(45) Date of Patent: *Jun. 25, 2024

(54) MICROFLUIDIC DEVICE AND A METHOD OF LOADING FLUID THEREIN

(71) Applicant: Sharp Life Science (EU) Limited, Oxford (GB)

(72) Inventors: Emma Jayne Walton, Oxford (GB); Lesley Anne Parry-Jones, Oxford (GB); Julie Karen Deacon, Oxford (GB)

(73) Assignee: Sharp Life Science (EU) Limited, Uxbridge (GB)

( * ) Notice: Subject to any disclaimer, the term of this patent is extended or adjusted under 35 U.S.C. 154(b) by 294 days.

This patent is subject to a terminal disclaimer.

(21) Appl. No.: 17/154,479

(22) Filed: Jan. 21, 2021

(65) Prior Publication Data

US 2021/0138469 A1 May 13, 2021

Related U.S. Application Data

(62) Division of application No. 15/759,685, filed as application No. PCT/JP2016/004199 on Sep. 14, 2016, now Pat. No. 10,926,260.

(30) Foreign Application Priority Data

Sep. 16, 2015 (GB) ..................................... 1516430

(51) Int. Cl.
*B01L 3/00* (2006.01)

(52) U.S. Cl.
CPC ... *B01L 3/502792* (2013.01); *B01L 3/502715* (2013.01); *B01L 3/502723* (2013.01);
(Continued)

(58) Field of Classification Search
None
See application file for complete search history.

(56) References Cited

U.S. PATENT DOCUMENTS

| | | | |
|---|---|---|---|
| 5,096,669 | A | 3/1992 | Lauks et al. |
| 5,503,803 | A | 4/1996 | Brown |

(Continued)

FOREIGN PATENT DOCUMENTS

| | | | |
|---|---|---|---|
| EP | 2213364 | | 8/2010 |
| EP | 2453220 | A1 | 5/2012 |

(Continued)

OTHER PUBLICATIONS

International Search Report for corresponding International Application No. PCT/JP2016/004199, dated Nov. 29, 2016.

(Continued)

*Primary Examiner* — Lore R Jarrett
(74) *Attorney, Agent, or Firm* — Renner, Otto, Boisselle & Sklar, LLP

(57) ABSTRACT

A microfluidic AM-EWOD device and a method of filling such a device are provided. The device comprises a chamber having one or more inlet ports. The device is configured, when the chamber contains a metered volume of a filler fluid that partially fills the chamber, preferentially maintain the metered volume of the filler fluid in a part of the chamber. The device is configured to allow displacement of some of the filler fluid from the part of the chamber when a volume of an assay fluid introduced into one of the one or more inlet ports enters the part of the chamber, thereby causing a volume of a venting fluid to vent from the chamber.

7 Claims, 10 Drawing Sheets

(52) U.S. Cl.
CPC . *B01L 2200/027* (2013.01); *B01L 2200/0605* (2013.01); *B01L 2200/0642* (2013.01); *B01L 2200/0673* (2013.01); *B01L 2200/0684* (2013.01); *B01L 2300/0809* (2013.01); *B01L 2300/0816* (2013.01); *B01L 2300/0864* (2013.01); *B01L 2300/165* (2013.01); *B01L 2400/0406* (2013.01); *B01L 2400/0427* (2013.01)

(56) References Cited

U.S. PATENT DOCUMENTS

| | | | |
|---|---|---|---|
| 10,309,926 | B2 | 6/2019 | Jansson et al. |
| 2006/0160210 | A1 | 7/2006 | Mori et al. |
| 2006/0166373 | A1 | 7/2006 | Enoki et al. |
| 2007/0242105 | A1* | 10/2007 | Srinivasan ........ B01L 3/502761 347/63 |
| 2008/0053205 | A1 | 3/2008 | Pollack et al. |
| 2008/0257438 | A1 | 10/2008 | Wang et al. |
| 2010/0120130 | A1 | 5/2010 | Srinivasan et al. |
| 2010/0282608 | A1 | 11/2010 | Srinivasan et al. |
| 2010/0282609 | A1 | 11/2010 | Pollack et al. |
| 2010/0316531 | A1 | 12/2010 | Delattre et al. |
| 2012/0111506 | A1 | 5/2012 | Rival |
| 2013/0161193 | A1 | 6/2013 | Jacobs et al. |
| 2014/0008222 | A1 | 1/2014 | Srinivasan et al. |
| 2014/0161686 | A1* | 6/2014 | Bort .................. B01L 3/502784 422/502 |
| 2014/0291152 | A1 | 10/2014 | Conoci et al. |
| 2015/0174578 | A1 | 6/2015 | Srinivasan et al. |

FOREIGN PATENT DOCUMENTS

| | | | |
|---|---|---|---|
| FR | 2967148 | A1 | 5/2012 |
| JP | 2006-329901 | A | 12/2006 |
| JP | 2006-329904 | A | 12/2006 |
| JP | 2012-103252 | A | 5/2012 |
| WO | WO 2006/129450 | A1 | 12/2006 |
| WO | WO 2010/115123 | A2 | 10/2010 |
| WO | WO 2014/135232 | A1 | 9/2014 |
| WO | WO 2015/164542 | A1 | 10/2015 |

OTHER PUBLICATIONS

Search Report for corresponding Patent Application No. GB1516430.4 dated Feb. 29, 2016.

Fair, R.B., "Digital microfluidics: is a true lab-on-a-chip possible?", Microfluid Nanofluid (2007) 3:245-281.

* cited by examiner

MICROFLUIDIC DEVICE AND A METHOD OF LOADING FLUID THEREIN

RELATED APPLICATIONS

This application is divisional application of U.S. application Ser. No. 15/759,685 filed on Mar. 13, 2018, which is a national phase of International Patent Application Serial No. PCT/JP2016/004199 filed on Sep. 14, 2016 which claims priority to GB Application No. 1516430.4 filed on Sep. 16, 2015, the entire disclosures of which are hereby incorporated by reference.

TECHNICAL FIELD

The present invention relates to a microfluidic device, and to a method for loading fluid into such a device. More particularly, the invention relates to an Active Matrix Electro-wetting on Dielectric (AM-EWOD) microfluidic device. Electro-wetting-On-Dielectric (EWOD) is a known technique for manipulating droplets of fluid on an array. Active Matrix EWOD (AM-EWOD) refers to implementation of EWOD in an active matrix array incorporating transistors, for example by using thin film transistors (TFTs).

BACKGROUND ART

Microfluidics is a rapidly expanding field concerned with the manipulation and precise control of fluids on a small scale, often dealing with sub-microlitre volumes. There is growing interest in its application to chemical or biochemical assay and synthesis, both in research and production, and applied to healthcare diagnostics ("lab-on-a-chip"). In the latter case, the small nature of such devices allows rapid testing at point of need using much smaller clinical sample volumes than for traditional lab-based testing.

A microfluidic device can be identified by the fact that it has one or more channels (or more generally gaps) with at least one dimension less than 1 millimeter (mm). Common fluids used in microfluidic devices include whole blood samples, bacterial cell suspensions, protein or antibody solutions and various buffers. Microfluidic devices can be used to obtain a variety of interesting measurements including molecular diffusion coefficients, fluid viscosity, pH, chemical binding coefficients and enzyme reaction kinetics. Other applications for microfluidic devices include capillary electrophoresis, isoelectric focusing, immunoassays, enzymatic assays, flow cytometry, sample injection of proteins for analysis via mass spectrometry, PCR amplification, DNA analysis, cell manipulation, cell separation, cell patterning and chemical gradient formation. Many of these applications have utility for clinical diagnostics.

Many techniques are known for the manipulation of fluids on the sub-millimetre scale, characterised principally by laminar flow and dominance of surface forces over bulk forces. Most fall into the category of continuous flow systems, often employing cumbersome external pipework and pumps. Systems employing discrete droplets instead have the advantage of greater flexibility of function.

Electro-wetting on dielectric (EWOD) is a well-known technique for manipulating discrete droplets of fluid by application of an electric field. It is thus a candidate technology for microfluidics for lab-on-a-chip technology. An introduction to the basic principles of the technology can be found in "Digital microfluidics: is a true lab-on-a-chip possible?" (R. B. Fair, Microfluid Nanofluid (2007) 3:245-281). This review notes that methods for introducing fluids into the EWOD device are not discussed at length in the literature. It should be noted that this technology employs the use of hydrophobic internal surfaces. In general, therefore, it is energetically unfavourable for aqueous fluids to fill into such a device from outside by capillary action alone. Further, this may still be true when a voltage is applied and the device is in an actuated state. Capillary filling of non-polar fluids (e.g. oil) may be energetically favourable due to the lower surface tension at the liquid-solid interface.

A few examples exist of small microfluidic devices where fluid input mechanisms are described. U.S. Pat. No. 5,096,669 (Lauks et al.; published Mar. 17, 1992) shows such a device comprising an entrance hole and inlet channel for sample input coupled with an air bladder which pumps fluid around the device when actuated. It is does not describe how to input discrete droplets of fluid into the system nor does it describe a method of measuring or controlling the inputted volume of such droplets. Such control of input volume (known as "metering") is important in avoiding overloading the device with excess fluid and helps in the accuracy of assays carried out where known volumes or volume ratios are required.

US20100282608 (Srinivasan et al.; published Nov. 11, 2010) describes an EWOD device comprising an upper section of two portions with an aperture through which fluids may enter. It does not describe how fluids may be forced into the device nor does it describe a method of measuring or controlling the inputted volume of such fluids. Related application US20100282609 (Pollack et al.; published Nov. 11, 2010) does describe a piston mechanism for inputting the fluid, but again does not describe a method of measuring or controlling the inputted volume of such fluid.

US20100282609 describes the use of a piston to force fluid onto reservoirs contained in a device already loaded with oil. US20130161193 describes a method to drive fluid onto a device filled with oil by using, for example, a bistable actuator.

Summary of Invention

A first aspect of the invention provides a method of loading a microfluidic device with an assay fluid, the method comprising: introducing, into a chamber in the microfluidic device, the chamber having one or more inlet ports, a metered volume of a filler fluid such that the chamber is partially filled with the filler fluid, said device being configured to preferentially maintain the metered volume of the filler fluid in a part of the chamber; and introducing a volume of the assay fluid into the part of the chamber via one of the one or more inlet ports and thereby causing a volume of a venting fluid to vent from the chamber.

A second aspect of the invention provides a method of loading a microfluidic device with an assay fluid, the method comprising: substantially completely filling a chamber with a filler fluid or with a fluid mixture containing a filler fluid as one component, the chamber having one or more inlet ports and an outlet port for extracting the filler fluid; inserting a volume of the assay fluid into one of the one or more inlet ports; and extracting sufficient of the filler fluid through the outlet port to enable at least some of the volume of the assay fluid to enter the chamber from the one of the one or more inlet ports.

A third aspect of the invention provides a microfluidic device, comprising: a chamber having one or more inlet ports; said device being configured to, when the chamber contains a metered volume of a filler fluid that partially fills the chamber, preferentially maintain the metered volume of the filler fluid in a part of the chamber; and the device being configured to allow displacement of some of the filler fluid from the part of the chamber when a volume of an assay fluid introduced into one of the one or more inlet ports enters the part of the chamber, thereby causing a volume of a venting fluid to vent from the chamber.

A fourth aspect of the invention provides a microfluidic device, comprising: a chamber having one or more inlet ports and an outlet port for extracting a filler fluid; whereby in use the chamber is substantially completely filled with the filler fluid, and a volume of an assay fluid introduced into one of the one or more inlet ports is enabled to enter the chamber as sufficient of the filler fluid is extracted through the outlet.

DESCRIPTION OF EMBODIMENTS

To the accomplishment of the foregoing and related ends, the invention comprises the features hereinafter fully described and identified in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

Figure 1:
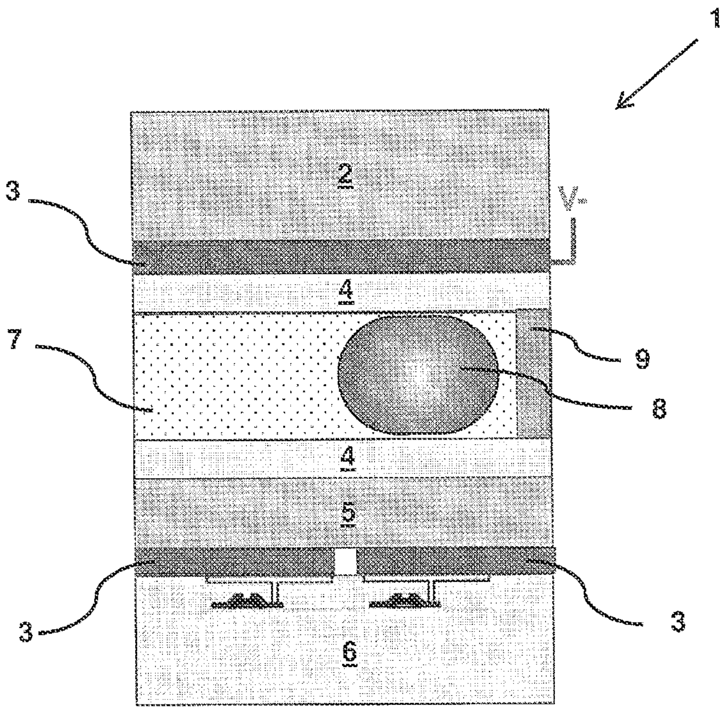
FIG. 1 is a schematic diagram depicting a conventional AM-EWOD device in cross-section.

FIG. 1 is a schematic diagram depicting a conventional AM-EWOD device 1 in cross-section. The AM-EWOD device 1 has a lower substrate 6, for example a CG ("continuous grain") silicon substrate and an upper substrate 2, for example of indium tin oxide (ITO) coated glass. Electrodes 3 are disposed upon the upper and lower substrates 2, 6. The electrodes 3 control the movement of liquid droplets 8 through the device 1. A liquid droplet 8, which may consist of any polar liquid and which typically may be ionic and/or aqueous, is enclosed between the lower substrate 6 and the top substrate 2, although it will be appreciated that multiple liquid droplets 8 can be present. The content of the liquid droplet will be referred to herein as "assay fluid" for convenience but, as explained below, this does not mean that the invention is limited to use in performing an assay A general requirement for the operation of the device is that the assay fluid comprises a polar fluid, typically a liquid, that may be manipulated by electro-mechanical forces, such as the electro-wetting force, by the application of electrical signals to the electrodes. Typically, but not necessarily, the assay fluid may comprise an aqueous material, although non-aqueous assay fluids (e.g. ionic liquids) may also be manipulated. Typically, but necessarily, the assay fluid may contain a concentration of dissolved salts, for example in the range 100 nM-100 M or in the range 1 uM to 10 M or in the range 10 uM to 1 M or in the range 100 uM to 100 mM or in the range 1 mM to 10 mM.

The assay fluid may optionally comprise a quantity of a surfactant material. The addition of a surfactant may be beneficial for reducing the surface tension at the interface between the droplet and the filler fluid. The addition of a surfactant may have further benefits in reducing or eliminating unwanted physical or chemical interactions between the assay liquid and the hydrophobic surface. Non-liming examples of surfactants that may be used in electro-wetting on dielectric systems include Brij O20, Brij 58, Brij S100, Brij S10, Brij S20, Tetronic 1107, IGEPAL CA-520, IGEPAL CO-630, IGEPAL DM-970, Merpol OJ, Pluronic F108, Pluronic L-64, Pluronic F-68, Pluronic P-105, Tween-20, Span-20, Tween-40, Tween-60.

Whilst the term assay is generally taken to refer to some analytical procedure, method or test, the term assay fluid in the scope of this invention may be taken more widely to refer to a fluid involved in any chemical or biochemical processes as may be performed on the AM-EWOD device, for example, but not limited to the following:

(a) A laboratory test for testing for the presence, absence or concentration of some molecular or bio-molecular species, for example a molecule, a protein, a sequence of nucleic acid etc (b) A medical or bio-medical test for testing for the presence, absence or concentration of some physiological fluid, species or substance, for example a medical diagnostic test (c) A procedure for preparing a material sample, for example the extraction, purification and/or amplification of a biochemical species, including but not limited to, a nucleic acid, a protein from a sample, a single cell from a sample (d) A procedure for synthesising a chemical or biochemical compound, including, but not limited to the examples of a protein, a nucleic acid, a pharmaceutical product or a radioactive tracer A suitable gap between the two substrates may be realized by means of a spacer 9, and a non-polar filler fluid 7, which could be oil, for example dodecane, silicone oil or other alkane oil, or alternatively air, may be used to occupy the volume not occupied by the liquid droplet 8. The inner surfaces of the upper 2 and lower substrates 6 may have a hydrophobic coating 4. Non-limiting examples of materials that may be used to form the hydrophobic coating include Teflon AF1600, Cytop, Parylene C and Parylene HT.

The lower substrate 6 may further be provided with an insulator layer 5. Here, and elsewhere, the invention has been described with regard to an Active Matrix Electrowetting on dielectric device (AM-EWOD). It will be appreciated however that the invention, and the principles behind it, are equally applicable to a 'passive' EWOD device, whereby the electrodes are driven by external means, as is well known in prior art. Likewise, in this and subsequent embodiments the invention has been described in terms of an AM-EWOD device utilizing thin film electronics 74 to implement array element circuits and driver systems in thin film transistor (TFT) technology. It will be appreciated that the invention could equally be realized using other standard electronic manufacturing processes to realise Active Matrix control, e.g. Complementary Metal Oxide Semiconductor (CMOS), bipolar junction transistors (BJTs), and other suitable processes.

Figure 2B:
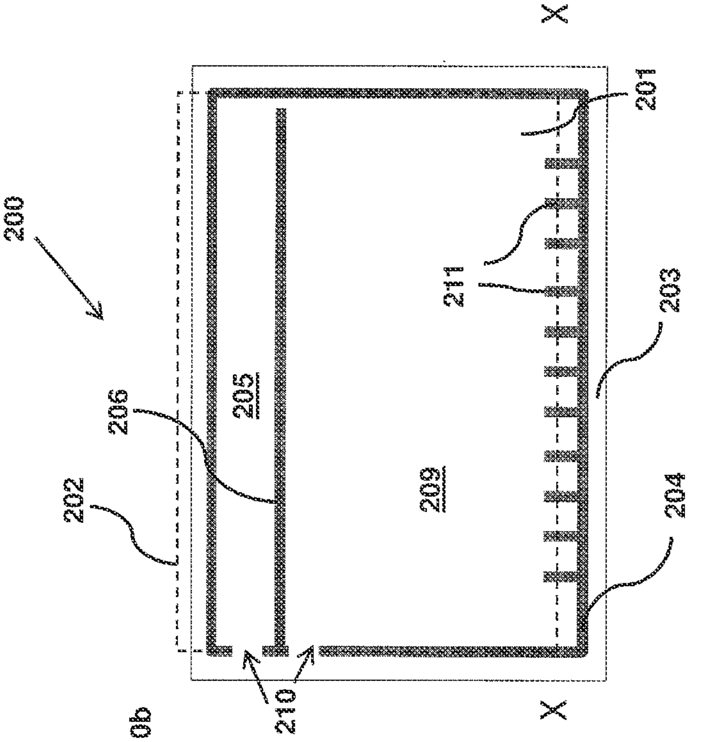
FIG. 2*b* is schematic diagrams depicting plan view of a microfluidic device in accordance with a second embodiment of the invention.
Figure 2A:
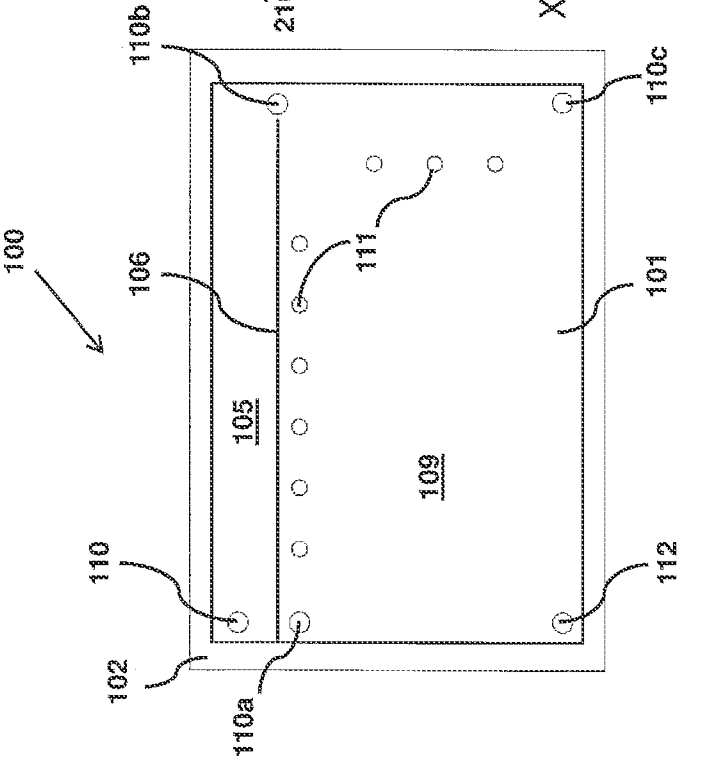
FIG. 2*a* is a schematic diagram depicting a plan view of a microfluidic device in accordance with a first and exemplary embodiment of the invention.

FIG. 2*a* is a schematic plan view of a microfluidic device in accordance with a first and exemplary embodiment of the invention. In this embodiment the device 100 is an electrowetting on dielectric Active Matrix Electro-wetting on Dielectric (AM-EWOD) device comprising electrodes (not shown in FIG. 2*a*). As in FIG. 1, the device 100 comprises a lower substrate (not visible in FIG. 2*a*), an upper substrate 102 spaced from the lower substrate so that a fluid chamber 101 is formed between the upper and lower substrates, and a fluid barrier provided between the lower substrate and the upper substrate 102 to define a perimeter of the chamber 101. The interior of the chamber 101 is at least partially coated with a hydrophobic coating. In this illustrated example, the fluid barrier is an adhesive track 106. The adhesive track 106 adheres the upper substrate 102 (in this example comprising ITO coated glass) to the lower substrate (in this example comprising a TFT chip).

To manufacture the device of this embodiment, the substrates are prepared and a glue track is disposed on one substrate. A spacer, for example a Kapton spacer, having a thickness equal to the desired cell gap is placed between the substrates, and the substrates are pushed together until the spacer prevents them from being pushed closer together. The glue is then cured to make it hard and seal the device. The cured glue track thus serves both to adhere the substrates to one another and to form a fluid barrier that retains fluids within the device chamber 101. Once the glue track has been cured, the spacer may be removed since the glue track is now the correct thickness or alternatively the spacer may be retained. The glue track may be formed of any suitable material that will adhere the substrates together and form a fluid seal.

Figure 3A:
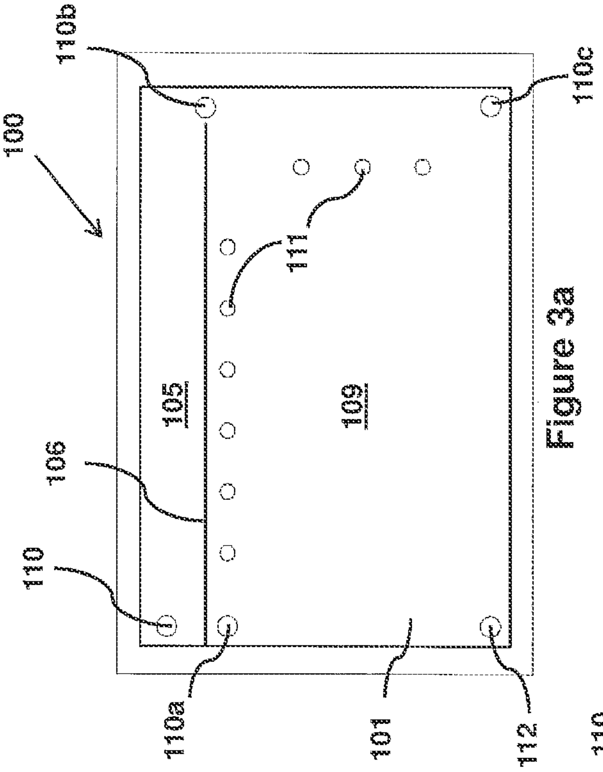
FIG. 3*a* is schematic diagram depicting a method of loading a microfluidic device in accordance with the first embodiment of the invention.

As an alternative, a photoresist pattern having the same general shape as the adhesive track of FIG. 3*a* may be formed on one substrate, for example by UV patterning. The photoresist pattern may then be used to bond the top and bottom substrates together, for example by heating the photoresist. No separate spacer is required, since the thickness of the photoresist pattern may be chosen to provide a desired cell gap between the substrates.

It should be understood that the invention is not limited to any particular implementation of the barrier. In principle a device of the invention could have a fluid barrier that does not adhere the substrates together. As a further example, the barrier could be a gap in the top substrate, for example a slot that is cut out of the top plate and that has a similar shape to the barrier of FIG. 2*a*. When oil (or other filler fluid) is introduced into the chamber, the oil would not cross the slot, but would fill the region inside this slot in the same way that it fills around a hole in the top substrate. Alternatively, a groove may be provided in the lower surface of the upper substrate—provided that the groove were of sufficient depth, oil would again not cross the groove and would be contained in the region inside the groove. (It will be understood that, if a slot is provided in the upper substrate, gaps are preferably left in the slot so that the slot does not divide the substrate into two separate pieces.)

The chamber 101 has a plurality of inlet ports 111, 112 and a plurality of vents 110. The inlet ports 111, 112 and vents 110 are provided in the upper substrate 102 of the device 100. In this example, the inlet ports comprise assay fluid inlets ports 111 and an oil inlet port 112. The inlet ports 111, 112 and the vents 110 are shown as (substantially) identical, comprising apertures in the upper substrate 102. However the invention is not limited to this, the inlet ports may be formed to be of differing sizes to one another, to hold different volumes of assay fluid. The apertures may be produced using a variety of techniques, for example, laser drilling or HF (hydrofluoric acid) etching, CNC drilling, powderblasting and moulding (in examples where the top plate is made of a plastics material). The vents 110 are substantially located at the periphery of the chamber 101. For example, at least one of the vents 110 is located in a corner of the chamber 101.

The chamber 101 further comprises a vent area 105 which is in fluid communication with at least one of the vents 110. The chamber 101 further comprises an active area 109 for carrying out one or more assays. The active area 109 is defined as the area over which fluid is loaded into the device and the assay is carried out. The vent area 105 and the active area 109 are defined by the adhesive track 106. In addition to a vent 110 at the end of the vent area 105, there is provided a further vent 110 at the end of the adhesive track 106, which separates the vent area 105 from the active area 109. This vent 110 is shown on the right hand side of FIG. 2*a*.

As noted, the device is provided with electrodes (not shown in FIG. 2*a*) in the active area, to allow manipulation of droplets of assay fluid within the active area. These electrodes may be considered as defining one or more "internal reservoirs" (not shown) in which fluid may be controlled by actuation of the electrodes of the device 100.

The device 100 is configured to, when the chamber 101 contains a metered volume of a filler fluid such as oil (not shown here) that partially fills the chamber 101, preferentially maintain the metered volume of the filler fluid in a part of the chamber 101; and to allow displacement of some of the filler fluid from the part of the chamber 101 when a volume of an assay fluid (not shown here) is introduced into one of the one or more inlet ports 111 enters the part of the chamber 101, thereby causing a volume of a venting fluid to vent through at least one of the vents 110. This is explained in more detail below.

Figure 2C:
FIG. 2*c* is schematic diagrams depicting cross-sectional view of a microfluidic device in accordance with a second embodiment of the invention.

FIG. 2*b* is a schematic diagram depicting a microfluidic device in accordance with a second embodiment of the invention. The device 100 of FIG. 2*a* may be described as top-loading, whereas the device 200 of FIG. 2*b* may be described as side-loading. An outer periphery of the spacer 204 and an outer periphery of the lower substrate 203 extend beyond an outer periphery of the upper substrate 202, and the inlet ports 211, 212 are defined by respective indentations provided in an internal edge of the spacer 204 and which extend beyond the upper substrate so as to provide fluid communication between the chamber 101 and the exterior of the device. In other structural respects, the device 200 of FIG. 2*b* is substantially identical to the device 100 of FIG. 2*a*. FIG. 2*c* shows a cross-section along the line X-X of FIG. 2*b*. In FIG. 2*b*, the larger indentation at the bottom left corner of the device may be used as the oil (or other filler fluid) inlet port. In practice it may be convenient for the oil inlet port to be larger than inlet ports for assay fluid, as a larger volume of oil is required to operate the device—and a large oil inlet port allows the use of a larger pipette tip. However, it isn't necessary for the oil inlet port to be larger than other ports, and in principle a small pipette could be used to dispense oil multiple times instead.

A method of introducing fluid into a microfluidic device 100 will now be described with reference to FIGS. 3*a* to 3*d*. FIGS. 3*a* to 3*d* are schematic diagrams which depict a microfluidic device in accordance with the first embodiment of the invention. FIG. 3*a* depicts the device 100 as described with reference to FIG. 2*a* above. In this example, the chamber 101 initially contains a venting fluid. In general the venting fluid may be any fluid. Typically the venting fluid may be air 115. Other examples of possible venting fluids include any inert atmosphere such as nitrogen or argon. Alternatively the fluid could be a polar liquid, for example, water. Advantageously, but not necessarily, the venting fluid may be substantially free from moisture, A combination of venting fluids, may also be utilised.

Figure 3B:
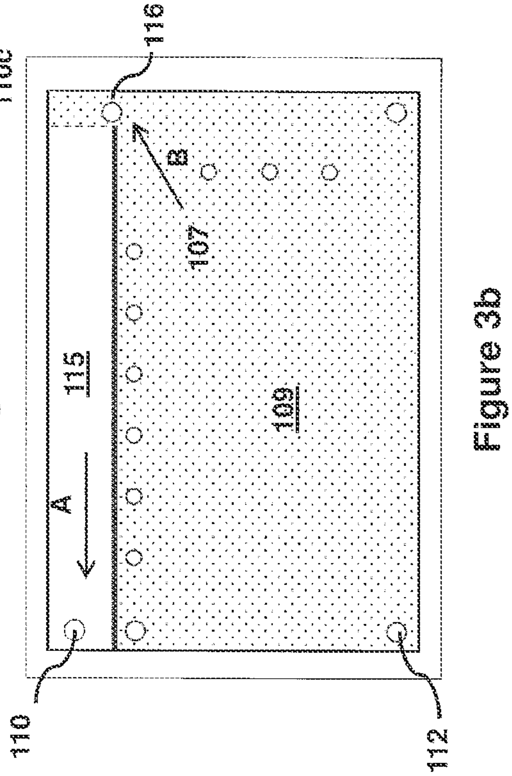
FIG. 3*b* is schematic diagram depicting a method of loading a microfluidic device in accordance with the first embodiment of the invention.

FIG. 3*b* indicates the introduction into the chamber 101 of a metered volume of filler fluid, in this case oil 107. The filler fluid is typically selected to be a non-polar material, or a material of low polarity. The filler fluid is typically selected to have a low interfacial surface tension with the assay fluid. The filler fluid is typically selected to be immiscible, or substantially immiscible with the assay fluid. The filler fluid may typically, but not necessarily have a low viscosity in order to maximise the speed of movement of droplets of the assay fluid. The filler fluid may typically, but not necessarily, have a lower density than the assay fluid. The filler fluid may typically, but not necessarily, be chosen to have a low or relatively low toxicity. The filler fluid may typically, but not necessarily, be chosen to have little or low reactivity with the materials comprising the assay fluid. The filler fluid is typically, but not necessarily a liquid.

Non-limiting examples of suitable filler fluids commonly used in electro-wetting on dielectric systems and suitable for this invention include silicone oils, alkanes, e.g. n-dodecane. Non-limiting examples of surfactants that may optionally be dissolved or partially dissolved in the oil include Brij 52, Brij 93, Tetronic 70, IGEPAL CA-210, MERPOL-A, Pluronic L-31, Pluroni L-61, Pluronic L-81, Pluronic L-121, Pluronic P-123, Pluronic 31R1, polyethylene-block-poly (ethylene glycol), Span 80 and Span 40.

Other suitable non-polar filler fluids may also be used. The oil 107 is introduced, for example pipetted, into the chamber 101 using the oil inlet port 112. It will be appreciated that the metered volume of oil 107 may be introduced into the chamber 101 by other suitable means. The volume of oil 107 is metered such that enough oil 107 is introduced to cover a desired part of the chamber but not to completely fill the chamber. In this embodiment the part of the chamber that contains oil includes the active area 109 of the chamber 101. As shown, the vent area 105 remains substantially filled with air 115 even after the metered volume of oil has been introduced.

The device 100 may be provided with an optical and/or an electrical sensor for metering the volume of the oil 107 introduced into the chamber. Alternatively, an optical and/or an electrical sensor may be provided separately. As a further example, the volume of oil 107 may be pre-measured before introduction to the chamber 101.

It will be appreciated that as the oil 107 is introduced to the chamber 101, air 115 in the active area 109 vents from the chamber until substantially all of the active area 109 is covered with oil 107. Air may vent through any suitable aperture, and so may vent though the assay fluid ports as well as though the vent 110 in the vent area. Apertures suitable for venting are preferably located at the periphery of the chamber 101, in particular in the corners of the chamber 101, in order to facilitate venting and to ensure no air 115 is trapped within the active area 109.

As shown in FIG. 3*b*, when the oil is introduced into the chamber, the inlet ports and vents remain dry since the oil fills around the inlet ports and vents.

The device 100 is configured to preferentially maintain the metered volume of oil 107 in the desired part of the chamber 101. In this example, the device 100 comprises a flow restriction element for this purpose. Due to the position of the adhesive track 106 and the vent 110 at the far right end of the vent area 115 (as noted, oil does not enter the vent area), a constriction 116 in a fluid flow path from the part of the chamber 101 to the vent area 105 is provided. This constriction 116 acts as an oil flow restriction element. The oil 107 therefore tends to reside in the active area 109 even when subject to marginal tilts of the chamber 101. A volume or bubble of air 115 remains within the vent area 105.

The dimensions of the constriction are determined based on the known properties of the filler fluid, for example its surface tension with the hydrophobic surface and with the assay fluid, its viscosity and its density.

Figure 3C:
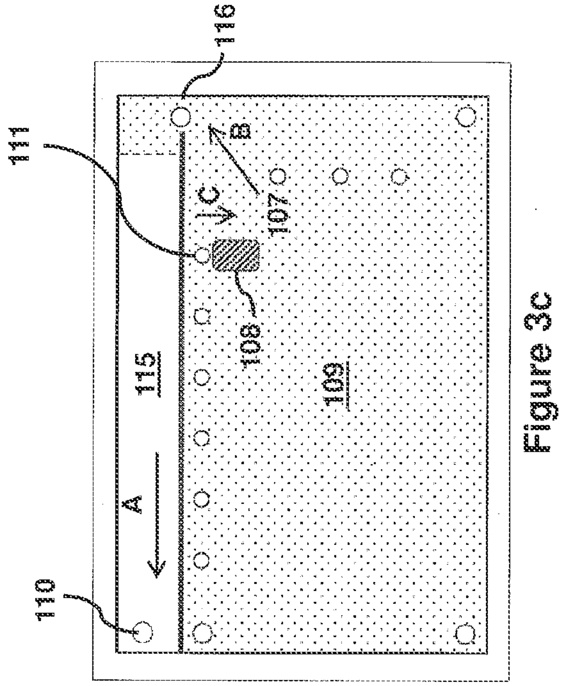
FIG. 3*c* is schematic diagram depicting a method of loading a microfluidic device in accordance with the first embodiment of the invention.
Figure 3D:
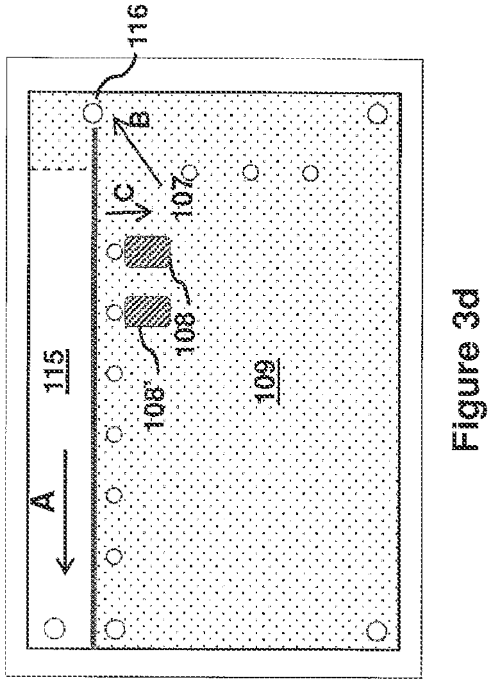
FIG. 3*d* is schematic diagram depicting a method of loading a microfluidic device in accordance with the first embodiment of the invention.

A volume of an assay fluid 108 is now introduced to the chamber 101 by loading into a fluid input port 111, as shown in FIG. 3*c*. This may be done using a pipette, alternatively another input method, such as a capillary track or line, could be used. The assay fluid 108 is a polar fluid, for example, blood. Alternatively, the assay fluid may be a type of reagent. The fluid input electrodes (not shown here) defining an internal reservoir of the device 10 are first activated. The assay fluid 108 is then pipetted into a fluid input port 111 whereby it enters the chamber 101 via capillary forces. In other words, the assay fluid 108 is drawn onto the active area 109. It will be appreciated that the assay fluid 108 enters the chamber 101 without the requirement for any pressure-actuated input means such as pistons, pumps or gravity wells or even for an electro-wetting force.

In this embodiment the fluid will draw into the device by capillary forces only. The direction in which fluid enters the chamber from a particular inlet port however will not be well controlled, and the fluid will likely occupy a circular region around the inlet port. Optionally, therefore, an electrowetting force may be applied to guide the direction of fluid fill—this is particularly advantageous if two or more different assay fluids are being introduced into the chamber via different inlet ports, and it is desired to control the manner in which different assay fluids contact one another. However, the electro-wetting force in this instance is used solely to control the position of the assay fluid 108 within the active area 109.

Alternatively, the device may be configured such that the capillary force is not sufficient to draw assay fluid from an inlet port into the chamber. (How this may be done is described elsewhere). In this case, application of an electrowetting force would both draw the fluid into the chamber and control the position of the assay fluid in the chamber. As the assay fluid 108 enters the chamber 101, substantially in the direction of arrow C, some of the oil 107 is laterally displaced from the active area 109 of the device 100. It will be understood that the assay fluid 108 and the oil 107 are substantially immiscible. As the active area 109 is substantially full of oil 107, the oil 107 is displaced into the vent area 105 through the constriction 116 in the direction indicted by arrow B of FIG. 3*c*. This causes a volume of air 115 to vent out of the chamber 101 through the air vent 110 at the far left end of the vent area 105. The volume of air 115 or air bubble moves towards the far left air vent 110, substantially in the direction indicated by arrow A in FIG. 3*c*. Hence, the air bubble decreases in size.

A further volume of assay fluid 108' is now introduced to the active area 109 of the chamber 101 via a second fluid inlet port 111. As described above, the assay fluid 108' causes some of the oil 107 to displace into the vent area 105, in turn causing a further volume of air 115 to vent through the air vent 110 at the far left of the vent area 105. The air bubble hence decreases further in size. The further volume of assay fluid 108' is controlled within an internal reservoir of the active area 109 by electro-wetting forces provided by fluid input electrodes in the lower substrate 103 of the device.

The further volume of assay fluid 108' may be substantially identical in composition to the first volume 108 or may have a different composition. For example, the first assay fluid 108 may be blood and the second assay fluid 108' may be reagent. The further volume of assay fluid 108' may have a substantially different volume, for example 2 ul (microlitres), or may have the same volume, for example 0.25 ul, as the first volume 108. The internal reservoirs are configurable to accommodate a range of fluid volumes, for example 0.1 ul to 100 ul. The volume and shape of the internal reservoirs can be changed by controlling the size and number of electrodes that define an internal reservoir.

Further volumes of assay fluid 108, 108' may be loaded into the active area 109 of the device 100 until all required fluids have been loaded, or until the vent area 105 is substantially completely filled with oil 107 and substantially all of the air 115 has vented. Once the vent area 105 is full of oil 107 no further assay fluid 108, 108' can be loaded unless some of the oil 107 is drained from the device 100. Once all required assay fluids 108, 108' have been loaded onto the active area, droplets can be formed from the internal reservoirs using standard EWOD operation. Fluid droplets may be dispensed from the internal reservoirs by electro-wetting function. Droplet size is easily adjusted, accurate and reproducible.

The configuration of the device 100 provides a simple method for inputting assay fluid into the device. Compared to the prior art, no external input pumps, input pistons or large gravity wells are required, and external moving parts are eliminated. The likelihood of leakage is therefore reduced, and a device of the invention is much simpler to manufacture. The lack of large pistons means that a larger number of fluid inputs can be provided in a given area. Furthermore, pre-determined volumes of assay fluid may be loaded onto the internal reservoirs, and the volumes of the internal reservoirs may be chosen to suit the desired amount of a particular assay fluid.

In the above example, the assay fluid 108 is introduced to the chamber 101 after the introduction of the oil 107. In another example, not illustrated here, one or more assay fluids and one or more filler fluids may be introduced substantially at the same time as one another. The fluids may be introduced by pipette or by any other suitable input means, through a fluid input port or other input port in the device. The fluids may be substantially mixed at the point of input or may be substantially separated. In this case, the assay fluid 108 is controlled within the chamber 101 by actuation of the electrodes during the introduction of the assay fluid 108 and filler fluid 107, so that the assay fluid is retained in the active area of the device.

In this example apertures 110*a*, 11*ob* and 110*c* are provided to act solely as vents since the arrangement of fluid inlet ports 111 of FIG. 3*a* may not provide adequate venting in the corners of the chamber 107—but in principle it may not be necessary to provide apertures intended to act solely as vents if the arrangement of inlet ports provides adequate venting of the chamber.

Moreover, in this embodiment all ports are designed to be dry when oil is introduced into the chamber. In an alternative embodiment it would be possible for all inlet ports to stay dry but for oil to enter venting ports (except for venting port 110 in the air vent area 105) when oil is introduced into the chamber. To do this the diameter of the venting ports would be made small so that they capillary fill with oil.

FIGS. 4*a* to 4*d* are schematic diagrams depicting a method of loading a microfluidic device in accordance with the second embodiment of the invention. The device 200 in this embodiment may be described as side-loading, as discussed with reference to FIG. 2*b* above. The method of loading a volume of assay fluid 208 into the device 200 is substantially the same method as described with reference to the first embodiment of FIGS. 3*a* to 3*d* above. In this embodiment, the Kapton spacer 204 generally separates the vent area 205 and active area 209 of the device 200, and defines a constriction (in this embodiment a narrow channel) between the vent area 205 and the active area 209. In addition, the spacer 204 creates separate filling zones along the bottom edge of the device 200. As previously discussed, the upper substrate 202 is smaller than the spacer 204 by a controlled amount to create small gaps around the perimeter of the device 200 through which fluid may be introduced or through which a venting fluid such as air may vent.

A metered volume of a filler fluid such as oil 207 is introduced, for example by pipette, into the chamber 201 through an aperture in the bottom left hand corner of the chamber 201. The volume of oil 107 is carefully controlled such that there is enough oil to substantially cover the active area 209 but the vent area 205 remains predominantly filled with venting fluid, in this case, air.

Once the metered volume of oil 207 has been loaded and substantially all of the air 215 in the active area 209 has vented via the vents 210, the fluid input electrodes (not shown here) of the internal reservoir are activated and a volume of assay fluid 208 is pipetted into one or more of the filling zones or fluid input ports 211 running along the bottom edge of the chamber 201. It will be appreciate that these input ports 211 may be positioned anywhere along the periphery of the active area 209.

The volume of assay fluid 208 enters the device 200 substantially in the direction of arrow C by capillary action and is controlled once it enters the chamber 201 by electro-wetting forces. As the assay fluid 208 enters the active area 209, some of the oil 207 is displaced through the constriction 216 into the vent area 205, substantially in the direction of arrow B. As some of the oil 207 enters the vent area 205, a volume of air 215 vents through the vent 210 at the far left end of the vent area 205, substantially in the direction of arrow A. The air bubble therefore decreases in size.

As described with reference to the first embodiment above, further volumes of assay fluid 208' may now be introduced into the chamber 201 and more of the oil will be displaced into the vent area 205, until such time as all of the required fluids have been loaded for an assay or all of the air 215 in the vent area 205 has vented. Further volumes of assay fluid 208, 208' may be introduced if a volume of the oil 207 is extracted from the chamber 201. Droplets for an assay may now be produced from the internal reservoirs of assay fluids 208, 208' by electro-wetting forces.

As discussed with reference to the first embodiment above, in an alternate method of filling one or more assay fluids and one or more filler fluids may be introduced to the chamber 201 substantially at the same time as each other.

FIGS. 5*a* to 5*d* are schematic diagrams depicting a method of loading a microfluidic device in accordance with a third embodiment of the invention. In this embodiment, the vent area 305 is integral to the active area 309 of the device 300 unlike in the first and second embodiments above. While a separate vent area simplifies operation, it takes up valuable space on the TFT chip.

In this embodiment the metered volume of filler fluid (oil 307) is again preferentially maintained in a part of the chamber 301 using a flow restriction element. In this example, the flow restriction element comprises one or more physical walls and possibly a patterned hydrophobic coating 314 on an interior of the chamber 301. The walls may for example be formed of adhesive or photoresist. If the device is tipped, the presence of walls alone may not be sufficient to contain the oil (or other filer fluid), and oil may escape the glue wall boundary. The hydrophobicity of the surface of one or both substrates may therefore be patterned to further retain the oil on areas within the wall. For example, the hydrophobic surface may be removed behind the inlet ports, so that oil will then preferentially go onto these areas. Then, if the device is tipped, the presence of walls and the patterned hydrophobic surface may be enough to keep the oil in the correct area for filling the assay fluid.

In alternative embodiments the physical walls alone may be sufficient, for example if the user is told not to tip the device.

This coating 314 provides "walls" which surround the fluid inputs 311.

Figures 5A, 5B, 5C, 5D:
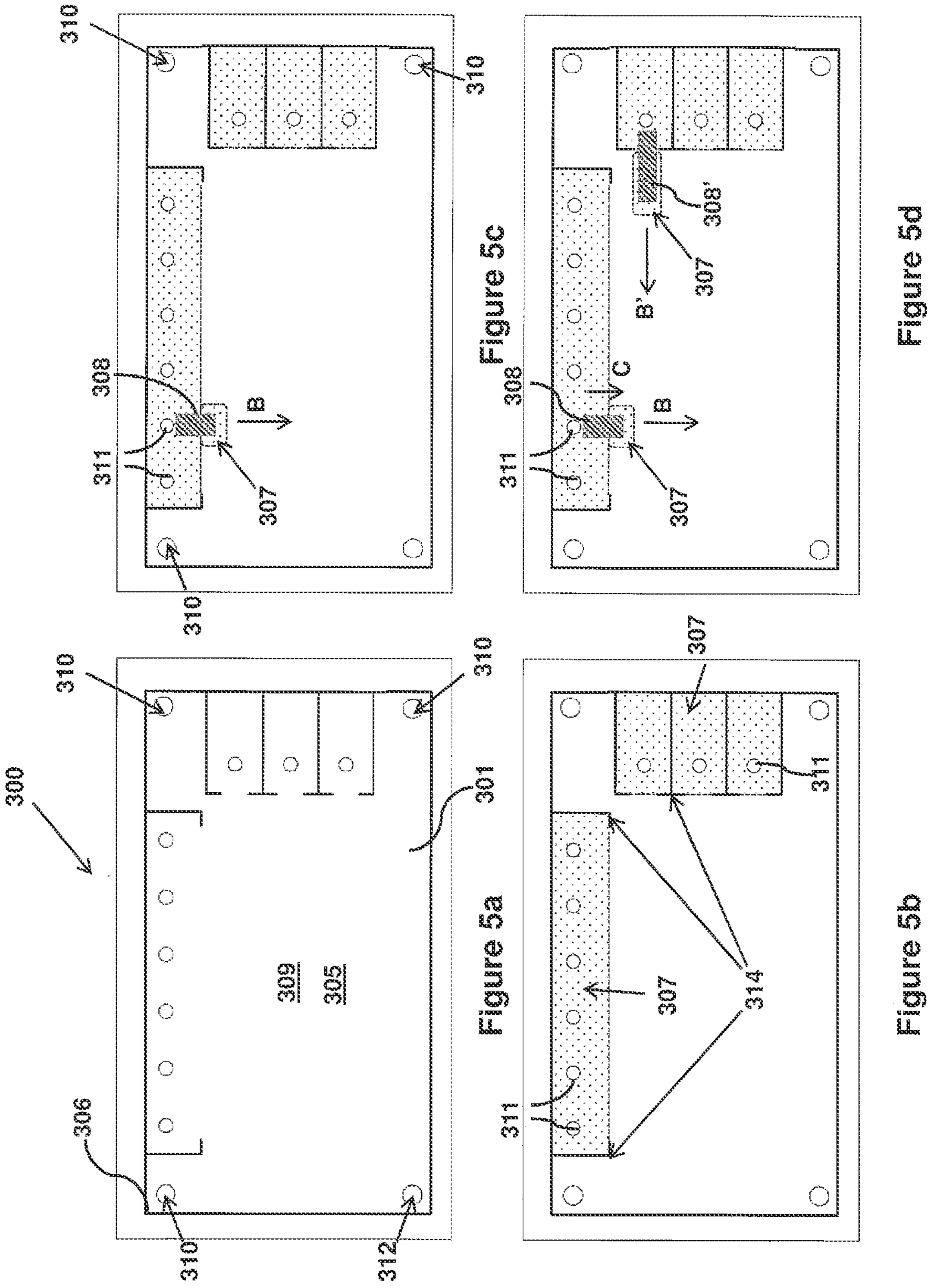
FIG. 5*a* is schematic diagram depicting a method of loading a microfluidic device in accordance with a third embodiment of the invention.
FIG. 5*b* is schematic diagram depicting a method of loading a microfluidic device in accordance with a third embodiment of the invention.
FIG. 5*c* is schematic diagram depicting a method of loading a microfluidic device in accordance with a third embodiment of the invention.
FIG. 5*d* is schematic diagram depicting a method of loading a microfluidic device in accordance with a third embodiment of the invention.

The device 300 shown in FIG. 5*a* is substantially filled with a venting fluid, in this case, air. A metered volume of oil 307 is input into the zones surrounded by the walls 314.

The oil 307 is constrained by the walls 314 and the pattern of hydrophobicity, and tends to remain in the zones. A volume of assay fluid 308 is then introduced to the active area 309 via a fluid input port 311. It will be noted that in this embodiment, fluid input ports 311 may be used to introduce oil 307 and assay fluid 308.

As the assay fluid enters the active area 309, it is constrained to enter the active area substantially in the direction indicated by arrow C by electro-wetting forces, provided by actuated electrodes (not shown). (As noted above, the capillary force may be sufficient to cause the assay fluid to enter the active region with the electro-wetting forces controlling the direction of fluid entry, or alternatively the electro-wetting forces may both cause the assay fluid to enter the active area and control the direction of fluid entry.) Some of the oil is displaced further into the active area 309, substantially in the direction of arrow B. Some of the air is vented through vents 310 as the oil 307 is displaced.

As shown in FIG. 5*d* and as described above for the first and second embodiments, further volumes of assay fluid 308' may be introduced into the chamber 301 until all fluids required for the assay are loaded or until the active area 309 is substantially filled with oil 307 i.e. all of the air has vented through the vents 310. Further volumes of assay fluid 308, 308' may be introduced if a volume of oil 307 is extracted or drawn out of the chamber 301.

As discussed for the embodiments above, one or more filler fluids and one or more assay fluids may be introduced to the device 300 substantially at the same time as each other rather than separately.

Figures 6A, 6B, 6C, 6D:
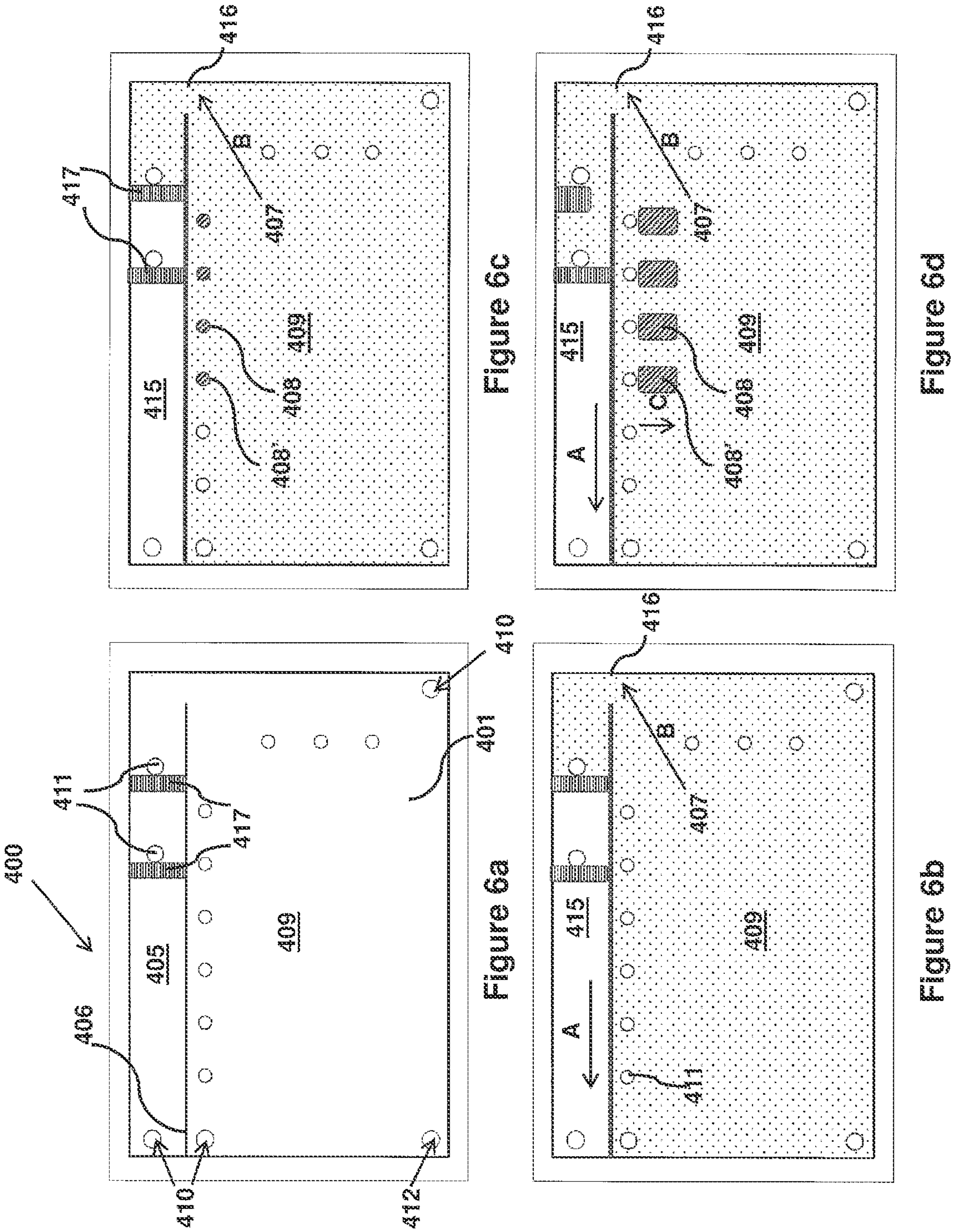
FIG. 6*a* is schematic diagram depicting a method of loading a microfluidic device in accordance with a fourth embodiment of the invention.
FIG. 6*b* is schematic diagram depicting a method of loading a microfluidic device in accordance with a fourth embodiment of the invention.
FIG. 6*c* is schematic diagram depicting a method of loading a microfluidic device in accordance with a fourth embodiment of the invention.
FIG. 6*d* is schematic diagram depicting a method of loading a microfluidic device in accordance with a fourth embodiment of the invention.

FIGS. 6*a* to 6*d* are schematic diagrams depicting a method of loading a microfluidic device in accordance with a fourth embodiment of the invention. The fourth embodiment of the microfluidic device 400 is structurally similar to the first embodiment discussed with reference to FIG. 2*a* above, and again comprises one or more flow restriction elements that preferentially maintain the metered volume of filler fluid (oil 407) in a desired part of the chamber 401. In this embodiment the flow restriction elements comprises one or more controllable flow restriction elements that can be controlled, for example electrically, to be in either an "open" state or a "closed state". FIG. 6*a* shows two electrically activated barriers 417 provided in series between the part of the chamber and the vent 410 at the far left end of the vent area 405, but the invention is not limited to this specific arrangement. Each of the barriers 417 comprise a fluid immiscible with the filler fluid 407. When a barrier is "closed", the fluid extends across the width of the vent area 405 as shown in FIG. 6*a*.

In this example, barrier electrodes (not shown) are provided at locations where it is desired to provide a barrier 417. A polar fluid (which may be an assay fluid), for example, water, is loaded into the vent area 405 to form one or more barriers or gates 417. The polar fluid may be loaded via input ports 411 adjacent to the barriers. The polar fluid is held within the barrier location by electro-wetting forces provided by the electrodes at the barrier location. A metered volume of oil 407 is then introduced to the chamber 401 as described for the first embodiment above, such that the active area 409 is substantially covered with oil 307 while the separate vent area 405 is substantially filled with air 415. It will be noted that oil 407 cannot fill the device 400 further than the first barrier 417, since the oil 407 is immiscible with the non-polar barrier fluid and, when the barrier is closed, the barrier fluid extends over substantially the entire width of the vent area.

Figures 4A, 4B, 4C, 4D:
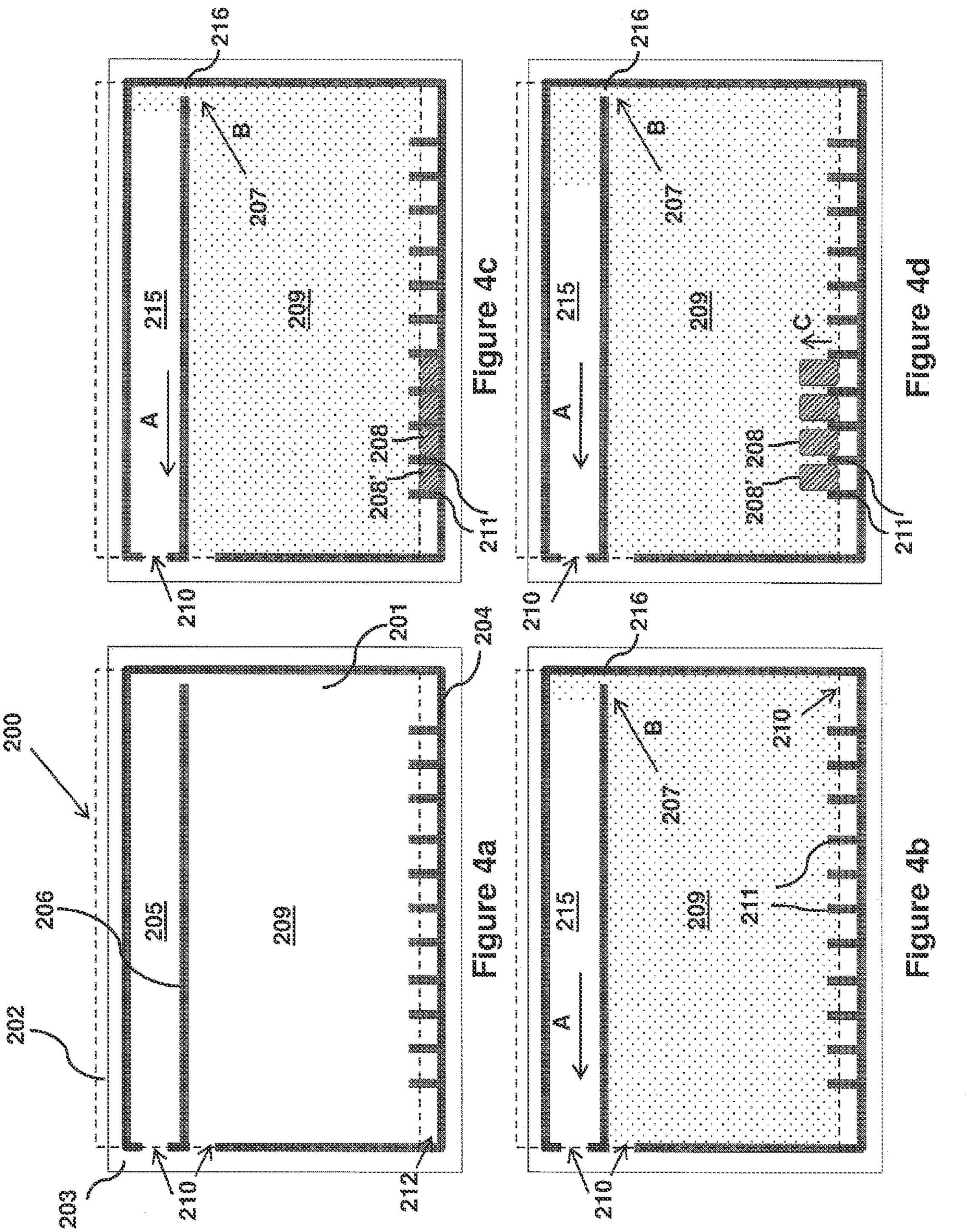
FIG. 4*a* is schematic diagram depicting a method of loading a microfluidic device in accordance with the second embodiment of the invention.
FIG. 4*b* is schematic diagram depicting a method of loading a microfluidic device in accordance with the second embodiment of the invention.
FIG. 4*c* is schematic diagram depicting a method of loading a microfluidic device in accordance with the second embodiment of the invention.
FIG. 4*d* is schematic diagram depicting a method of loading a microfluidic device in accordance with the second embodiment of the invention.

The provision of the barrier(s) 417 means that the constriction 116, 216 of FIG. 3*b* or 4*b* 2*a* is not needed in this embodiment and may be removed, as indicated by the larger gap 416 of FIG. 6*b*. In principle however a constriction could be provided in the embodiment of FIGS. 6*a*-6*d*.

One or more volumes of assay fluid 408, 408' may then be loaded into one or more of the fluid input ports on the active area 409. Since the oil 307 is prevented from being displaced into the vent area 405 by the barrier 417, the volume or volumes of assay fluid 408, 408' are unable to enter the chamber 401 and are therefore "stored" in the fluid inlet port 411. This method is advantageous in that assay fluids may be "stored" until all fluids are loaded and the assay is ready to begin.

When a user is ready to load assay fluid 408, 408' into the device 400, the position of the barrier fluid in one or more of the barriers 417 may be changed by suitably controlling the barrier active electrode(s). The barrier fluid is reconfigured so that it no longer extends over the entire width of the vent area, so allowing some of the oil 407 to flow past the barrier 417 into the vent area 405, as shown in FIG. 6*d*. Oil may now be displaced from the active area substantially in the direction of arrow B into the vent area 405 and one or more volumes of assay fluid 408, 408' stored in the inlet ports are drawn onto the active area, with the direction of fluid entry substantially in the direction indicated by arrow C as controlled by electro-wetting forces. Air 415 in the vent area 405 may vent through the fluid input ports 411 adjacent the barriers 417.

It will be appreciated that multiple barriers 417 may be provided in order to allow staged introduction of one or more volumes of assay fluid 408, 408' into the active area 409.

Figures 7A, 7B, 7C, 7D:
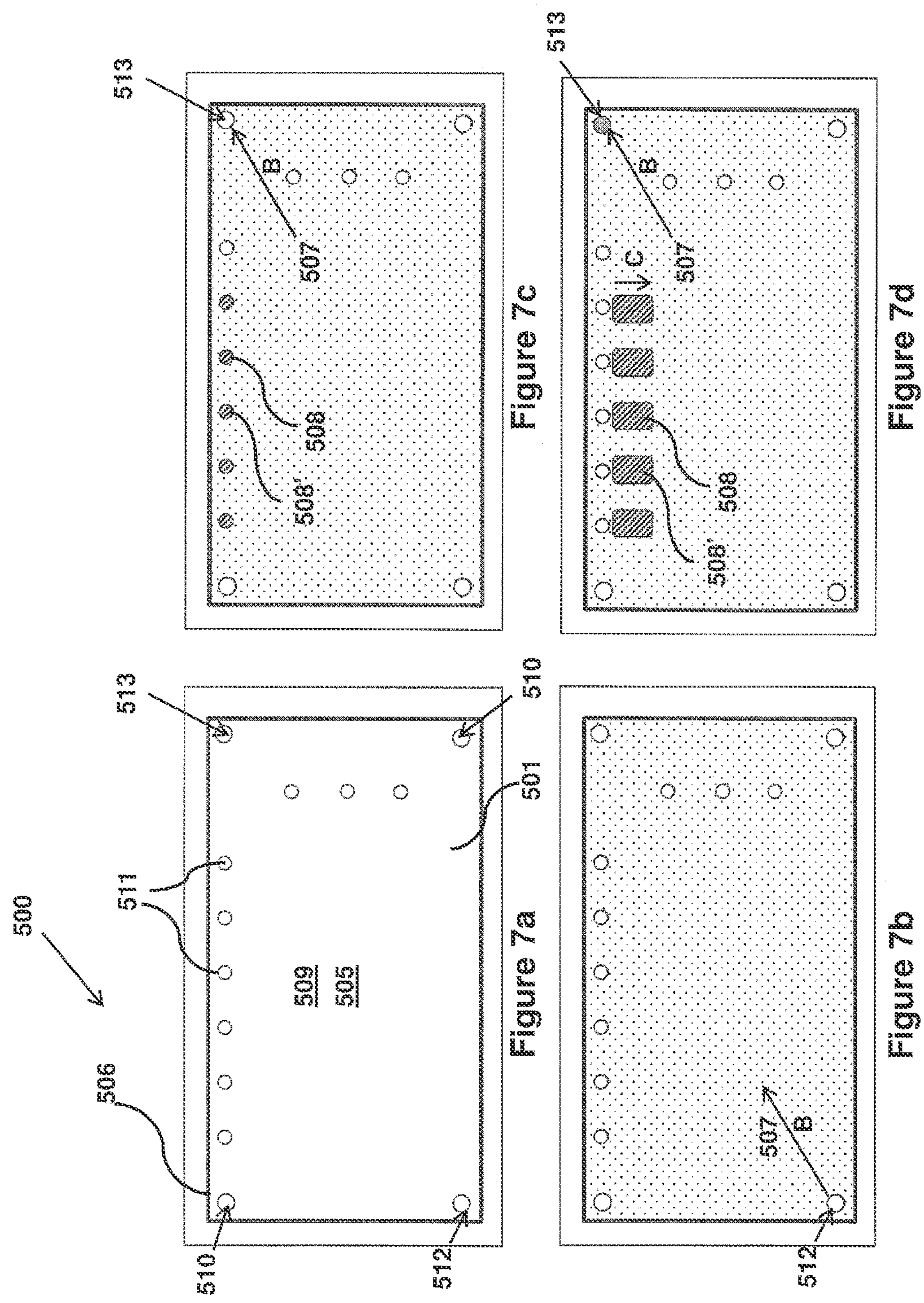
FIG. 7*a* is schematic diagram depicting a method of loading a microfluidic device in accordance with a fifth embodiment of the invention.
FIG. 7*b* is schematic diagram depicting a method of loading a microfluidic device in accordance with a fifth embodiment of the invention.
FIG. 7*c* is schematic diagram depicting a method of loading a microfluidic device in accordance with a fifth embodiment of the invention.
FIG. 7*d* is schematic diagram depicting a method of loading a microfluidic device in accordance with a fifth embodiment of the invention.

FIGS. 7*a* to 7*d* are schematic diagrams depicting an alternative method of loading a microfluidic device in accordance with a fifth embodiment of the invention. In this embodiment, the device 500 does not comprise a vent area which is separated from an active area. In use, the device 500 is firstly substantially completely filled with filler fluid (eg oil 507) via oil input port 512, as shown in FIG. 7*b*. As the device 500 is filled with oil 507, any venting fluid (air) present within the chamber 501 will vent out of the vent area 505 through vents 510. The oil 507 will fill around the vents 510 and the fluid input ports 511 such that these apertures remain dry.

One or more volumes of assay fluid 508, 508' are then loaded into fluid input ports 511. The assay fluid 508, 508' remains in the input ports since the oil 507 cannot be displaced as the chamber 501 is full, as shown in FIG. 7*c*.

Some of the oil 507 is now extracted via the oil outlet port 513, and leaves the chamber 501 substantially in the direction indicated by arrow B. Extraction may comprise the use of a capillary line, pipette or absorbing pad, for example. As some of the oil 507 is removed from the active area 509, assay fluid 508, 508' is drawn into the chamber 501, substantially in the direction of arrow C, by capillary forces and is controlled by electro-wetting into internal reservoirs. The volume of extracted oil 507 is carefully metered to match the volume(s) of assay fluid(s) which is required to be loaded into the device 500.

In the above embodiments, the device is arranged such that assay fluid introduced into an inlet port would naturally be drawn into the chamber 101, and is restrained from doing this solely because the active area of the device already contains fluid (either filler fluid or a combination of filler fluid and one or more previously introduced assay fluids). This may be arranged by choosing suitable values for the cell gap (that is the separation between the upper and lower substrate), the hydrophobic coating, and the properties of the assay fluid(s) such as viscosity, density and surfactant level. For example, the cell gap may be chosen based on knowledge of the assay fluid(s) to be used. The assay fluid may then be introduced into the chamber in a controlled manner according to any of the embodiments described above.

The invention is not however limited to this, and the device could alternatively be arranged such that assay fluid introduced into an inlet port would naturally remain in the inlet port. FIGS. 8*a* to 8*e* are schematic diagrams depicting a method of loading a microfluidic device in accordance with a sixth embodiment of the invention, in which the device is configured in this way. In this embodiment, the device 600 provided with a vent area 605 which is integral to the active area 69 of the chamber.

One or more volumes of assay fluid 608, 608' are introduced, for example by pipette, to the fluid input ports 611. The active area 609 is substantially filled with venting fluid (air) only at this stage, such that the assay fluid 608, 608' is not drawn onto the active area 609 by capillary action and remains in the input ports 611. A metered volume of filler fluid such as oil 607 is now introduced to the device 600 via an input port 612. As the oil 607 flows across the active area 609, substantially in the direction indicated by arrow B, the assay fluid 608 is drawn out of the input port(s) onto the active area 609 by capillary forces. Once within the active area 609 the assay fluid 608 is held in position by electrowetting forces provided by actuated electrodes. Air contained within the active area 609 vents through vents 610.

Figures 8A, 8B, 8C, 8D, 8E:
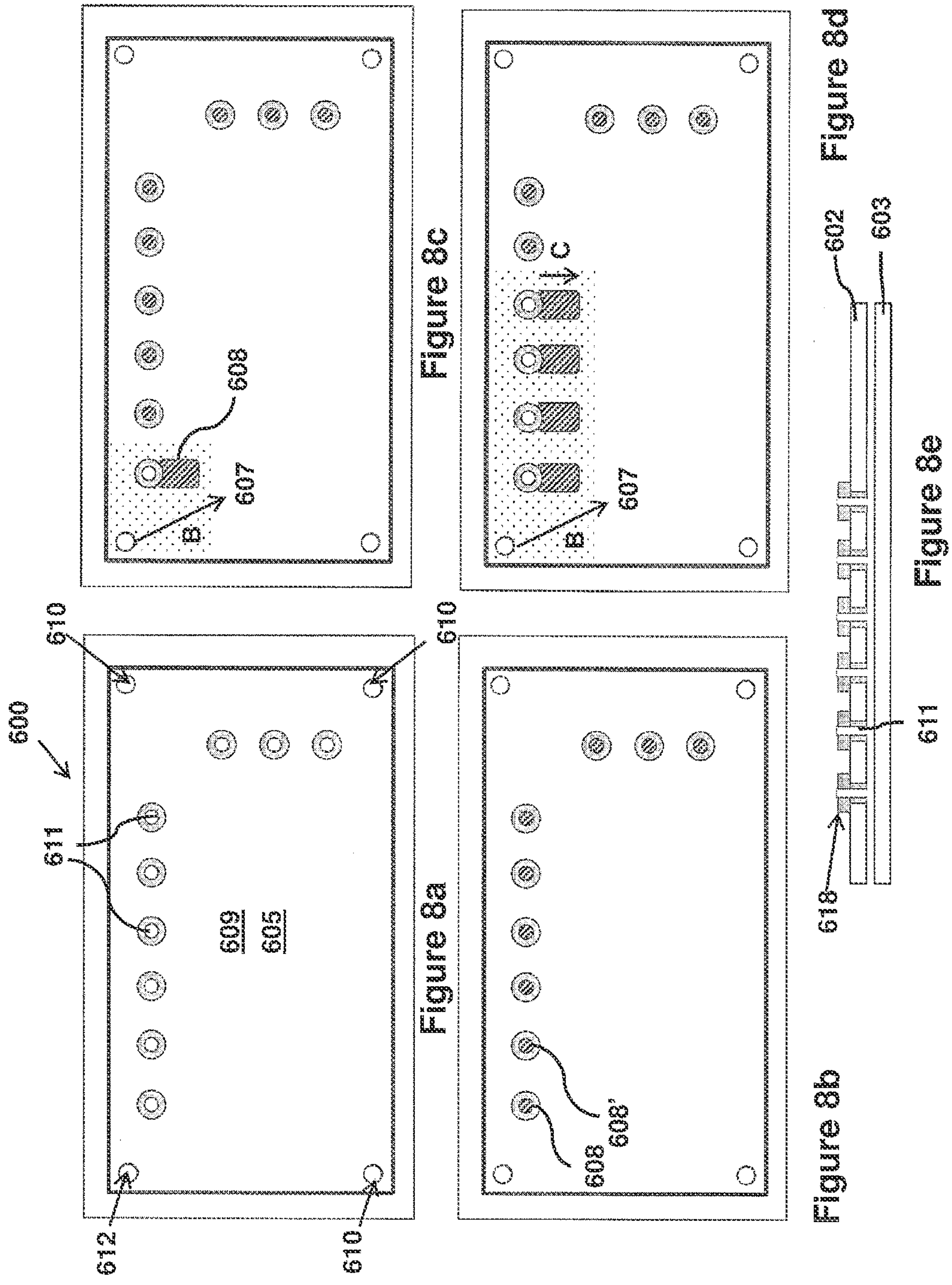
FIG. 8*a* is schematic diagram depicting a method of loading a microfluidic device in accordance with a sixth embodiment of the invention.
FIG. 8*b* is schematic diagram depicting a method of loading a microfluidic device in accordance with a sixth embodiment of the invention.
FIG. 8*c* is schematic diagram depicting a method of loading a microfluidic device in accordance with a sixth embodiment of the invention.
FIG. 8*d* is schematic diagram depicting a method of loading a microfluidic device in accordance with a sixth embodiment of the invention.
FIG. 8*e* is schematic diagram depicting a method of loading a microfluidic device in accordance with a sixth embodiment of the invention.
Figure 9A:
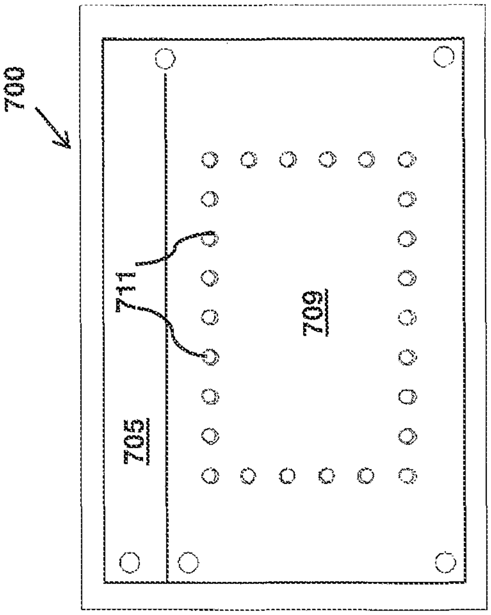
FIG. 9*a* is schematic diagram depicting a method of loading a microfluidic device in accordance with a seventh embodiment of the invention.
Figure 9B:
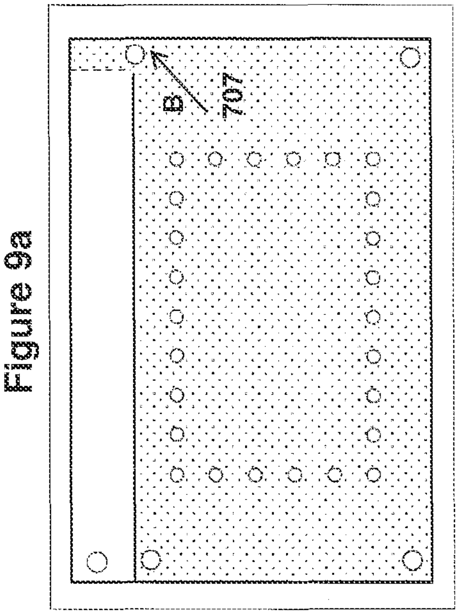
FIG. 9*b* is schematic diagram depicting a method of loading a microfluidic device in accordance with a seventh embodiment of the invention.
Figure 9C:
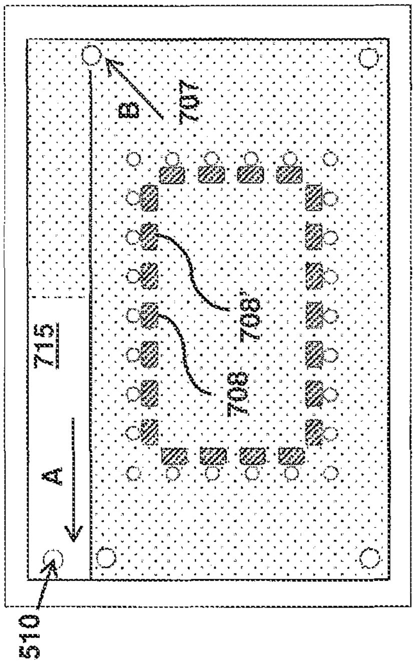
FIG. 9*c* is schematic diagram depicting a method of loading a microfluidic device in accordance with a seventh embodiment of the invention.
Figure 9D:
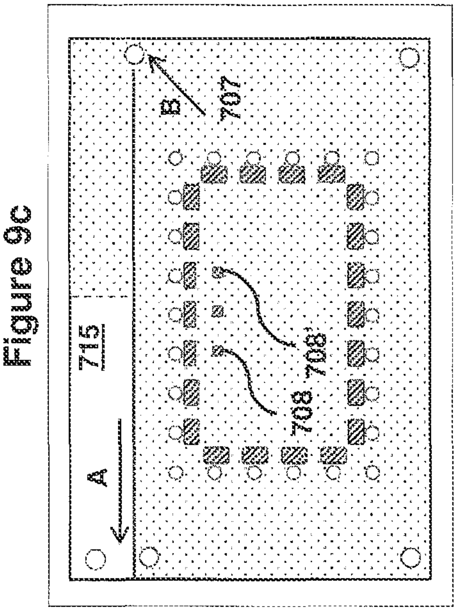
FIG. 9*d* is schematic diagram depicting a method of loading a microfluidic device in accordance with a seventh embodiment of the invention.

Further metered volumes of oil 607 may now be introduced into the device 600 such that oil 607 moves further across the active area 609 and further volumes of assay fluid 608' are drawn into the device 600, as shown in FIG. 8*d*. The process of loading assay fluids 608, 608' and oil 607 may continue until all required fluids have been loaded or until the active area 609 is substantially filled with oil 607. Oil 607 may then be extracted from the device 600 in order to load further assay fluids 608, 608'.

Optionally in this embodiment one or more of, and optionally all of, the fluid input ports 611 further comprise an upper well 618 in which a larger volume of assay fluid 608, 608' may be held than in the fluid input ports 611 themselves. As shown in the cross section of FIG. 8*e*, the wells 618 may comprise plastic slots in the ports 611 which are formed in the upper substrate 602 of the device 600.

It will be understood that wells similar to the wells 618 may be provided in the devices used in other embodiments of the invention. This is of particular benefit in embodiments in which assay fluid is "pre-stored" in an inlet port, such as in the embodiment of FIGS. 6*a* to 6*d*.

FIGS. 9*a* to 9*d* are schematic diagrams depicting a method of loading a microfluidic device in accordance with a seventh embodiment of the invention. In this embodiment, a device 700 substantially identical to that of the first embodiment discussed with reference to FIG. 2*a* is provided with 26 separate fluid input ports 711. The ports 711 are positioned around a perimeter of the active area 709 of the device, however, their position may be varied as required. It will be appreciated that each port 711 may be used for a different assay fluid 708, 708' as required. The internal reservoirs associated with each input port 711 may be varied with regard to shape and volume as discussed above in order to accommodate the volume of assay fluid required for an assay.

In this way, the device 700 provides a flexible, versatile and easy method of loading fluids for an assay. Although the structure of the device 700 is comparable with that of the first embodiment discussed above, it will be understood that any of the embodiments discussed herein may be provided with a similar number of fluid input ports. The number of ports is restricted only by the size of the device and hence may be varied to suit the requirements of the assay or assays to be carried out. The device may be configured such that assays may be carried out in parallel. In addition, the configuration of the fluid input ports of the various embodiments discussed above provide consistent heating of fluids within the device, since no large, tall fluid wells are required.

A number of potential applications for microfluidics devices require some form of thermal control. A further advantage of the present invention is that, by eliminating bulky input devices such as pistons, tubes or tall fluid wells, it is possible to obtain much better uniformity of temperature over the active area, even in embodiments where the ports and vents are provided by holes in the upper substrate.

Figure 10A:
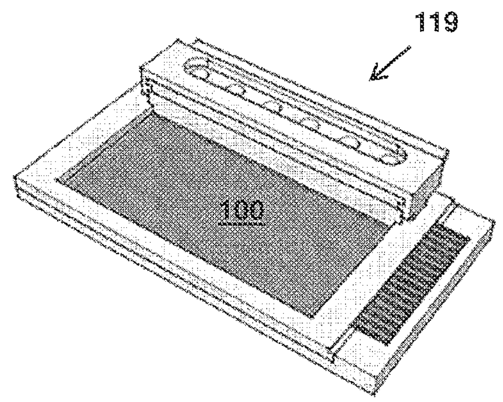
FIG. 10*a* is a graphical representation of a cartridge based around a microfluidic device.
Figure 10B:
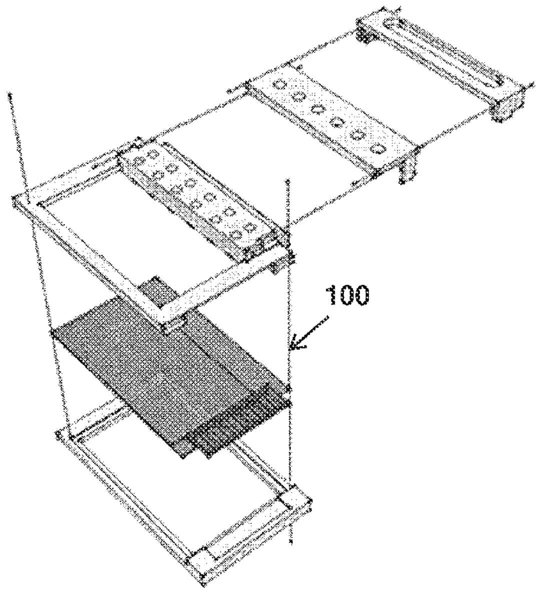
FIG. 10*b* is an exploded view of the cartridge of FIG. 10*a*.

FIG. 10*a* is a graphical representation of a cartridge 119 based around a microfluidic device. In this illustrated example, the device 100 shown is the device of the first embodiment, however, any of the embodiments discussed herein may be included in a similar cartridge 119. The cartridge 119 in this example is configured to be disposable and/or recyclable and suitable for manufacture at large volumes (for example, millions of units a year) and at low cost. The cartridge acts as the interface for the fluids within the AM-WOD device and the outside world and may also provide heating for fluid droplets contained within the device. FIG. 10*b* is an exploded view of the cartridge of FIG. 10*a* in which the various components of the cartridge are displayed.

Figure 11A:
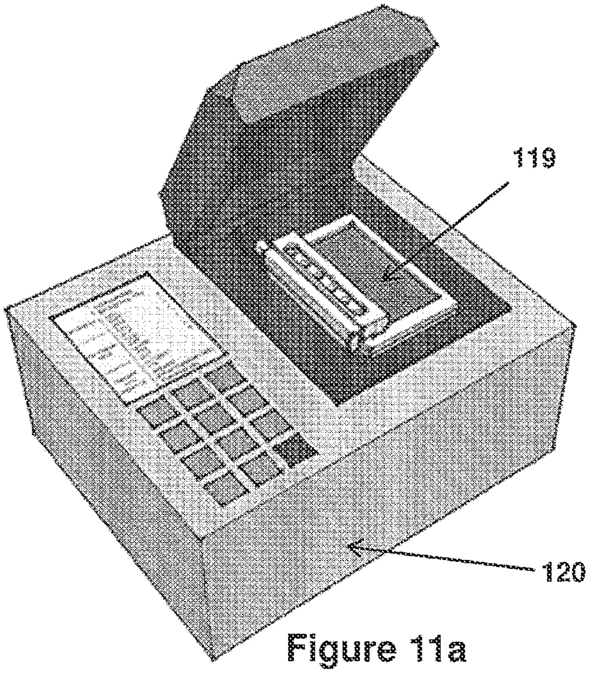
FIG. 11*a* is a graphical representation of a benchtop reader device to control the operation of a microfluidic device.
Figure 11B:
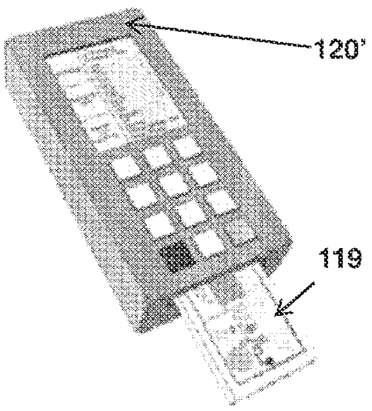
FIG. 11*b* is a graphical representation of a handheld reader device to control the operation of a microfluidic device.

FIG. 11*a* is a graphical representation of a benchtop control/reader device 120 configured to control the operation of a microfluidic device contained within the cartridge and read out data as appropriate of FIGS. 10*a* and 10*b*. FIG. 11*b* is a graphical representation of a handheld control/reader device 120' configured to control the operation of such a microfluidic device. The cartridge 119 containing the microfluidic device (100, 200, 300, 400, 500, 600, 700) is inserted or connected into the control/reader device 120, 120', as is known in the art.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

(Overview)

A first aspect of the invention provides a method of loading a microfluidic device with an assay fluid, the method comprising: introducing, into a chamber in the microfluidic device, the chamber having one or more inlet ports, a metered volume of a filler fluid such that the chamber is partially filled with the filler fluid, said device being configured to preferentially maintain the metered volume of the filler fluid in a part of the chamber; and introducing a volume of the assay fluid into the part of the chamber via one of the one or more inlet ports and thereby causing a volume of a venting fluid to vent from the chamber.

The chamber may have at least one vent in addition to the inlet port(s), so that the venting fluid vents from the chamber through the at least one vent. By "vent" is meant a port that is provided solely to allow venting fluid to vent from the chamber, and that is not used as an inlet port. Alternatively, the venting fluid may vent from the chamber through one or more of the inlet ports.

A second aspect of the invention provides a method of loading a microfluidic device with an assay fluid, the method comprising: substantially completely filling a chamber with a filler fluid or with a fluid mixture containing a filler fluid as one component, the chamber having one or more inlet ports and an outlet port for extracting the filler fluid; inserting a volume of the assay fluid into one of the one or more inlet ports; and extracting sufficient of the filler fluid through the outlet port to enable at least some of the volume of the assay fluid to enter the chamber from the one of the one or more inlet ports. In this aspect the chamber may be initially filled with filler fluid, and the method may then be used to enable the introduction of assay fluid. Alternatively, the chamber may initially be filled with a mixture of filler fluid and an assay fluid, and the method may then be used to enable the introduction of more assay fluid and/or of one or more different assay fluids.

The present invention allows assay fluid to be introduced easily into the device. There is no need to apply high pressure to force the assay fluid into the device, and problems associated with the use of pistons and pumps, such as the need to the provide a good, high-pressure seal at the inlet port in order to avoid sample loss and/or introduction of air bubbles are overcome. A device of the invention is simple, and hence cheap, to manufacture, and is simple to operate. A further advantage is that many inlet ports may easily be provided on a device, whereas the physical size of pumps/pistons or gravity wells used in the prior art means that it is difficult to accommodate them on a typical device.

In either aspect, the method may further comprise introducing the filler fluid and the assay fluid into the chamber at substantially the same time as one another. The wording "at substantially the same time as one another" is intended to cover a method in which the time period within which the filler fluid is introduced overlaps the time period within which assay fluid is introduced. Alternatively, in either aspect of the invention the filler fluid may be introduced into the chamber first, with the assay fluid being introduced into the chamber after the filler fluid has been introduced. As a further alternative, in either aspect of the invention the assay fluid may first be introduced into one or more of the inlet ports but the assay fluid remains in the inlet port(s). (Essentially this requires that the device and the assay fluid are arranged so that the capillary force tending to draw the assay fluid from the inlet port(s) into the chamber is not sufficient to overcome the repulsion of the fluid by the chamber—which is naturally hydrophobic.) When filler fluid is introduced into the chamber, it acts to draw assay fluid into the chamber.

The device may be an electro-wetting on dielectric (EWOD) device comprising electrodes. The method may further comprise controlling the assay fluid within the chamber by actuation of said electrodes.

Where the filler fluid and the assay fluid are introduced into the chamber at substantially the same time as one another, the method may comprise controlling the assay fluid within the chamber by actuation of said electrodes during the introduction of the filler fluid and the assay fluid into the chamber.

In a method of the first aspect, the volume of the assay fluid may be introduced into the chamber after the metered volume of filler fluid has been introduced into the chamber, whereby the assay fluid may enter the part of the chamber by displacing some of the filler fluid from the part of the chamber.

At least part of an interior of the chamber may be coated with a hydrophobic coating.

The device may be configured such that the one or more inlet ports are provided in an upper surface of the chamber. If one or more vents are present, this/they may also be provided in the upper surface of the chamber.

The device may be configured such that the one or more inlet ports are provided in one or more sides of the chamber. If one or more vents are present, this/they may also be provided in the sides of the chamber.

The device may be configured such that the chamber is provided with a vent area in fluid communication with at least one vent, said vent area configured to contain the venting fluid.

The device may be configured to have at least one vent that is substantially identical to the one or more inlet ports.

The device may be configured such that the chamber is provided with an active area for carrying out one or more assays.

The device may be configured such that the vent area is integral to the active area.

The device may be configured such that the vent area is partially separated from the active area by a fluid-impermeable barrier.

The method may further comprise preferentially maintaining the metered volume of the filler fluid in the part of the chamber using a flow restriction element.

The flow restriction element may be a patterned hydrophobic coating on an interior of the chamber.

The flow restriction element may be a constriction in a fluid path from the part of the chamber to the vent area.

The method may comprise maintaining the metered volume of the filler fluid in a part of the chamber using one or more electrically activated barriers between the part of the chamber and the vent, said one or more barriers comprising a fluid immiscible with the filler fluid.

The method may further comprise metering the metered volume of the filler fluid by one of volume measurement, optical sensing, and electrical sensing.

A vent may be provided substantially at a corner of the part of the chamber. This eliminates the risk of air being trapped at the corner when the filler fluid is introduced into the chamber. Preferably a vent is provided at every corner of the part of the chamber.

A method of the invention may further comprise introducing a second assay fluid, for example via another inlet port. This may be repeated until all desired assay fluids have been introduced into the chamber.

A third aspect of the invention provides a microfluidic device, comprising: a chamber having one or more inlet ports; said device being configured to, when the chamber contains a metered volume of a filler fluid that partially fills the chamber, preferentially maintain the metered volume of the filler fluid in a part of the chamber; and the device being configured to allow displacement of some of the filler fluid from the part of the chamber when a volume of an assay fluid introduced into one of the one or more inlet ports enters the part of the chamber, thereby causing a volume of a venting fluid to vent from the chamber.

A fourth aspect of the invention provides a microfluidic device, comprising: a chamber having one or more inlet ports and an outlet port for extracting a filler fluid; whereby in use the chamber is substantially completely filled with the filler fluid, and a volume of an assay fluid introduced into one of the one or more inlet ports is enabled to enter the chamber as sufficient of the filler fluid is extracted through the outlet.

In a device of the third or fourth aspect the chamber may have at least one vent in addition to the inlet port(s), so that the venting fluid vents from the chamber through the at least one vent. By "vent" is meant a port that is provided solely to allow venting fluid to vent from the chamber, and that is not used as an inlet port. Alternatively, the venting fluid may vent from the chamber through one or more of the inlet ports.

The device may be an electro-wetting on dielectric (EWOD) device comprising electrodes and the assay fluid may, in use, be controlled within the chamber by actuation of said electrodes.

An interior of the chamber may be is at least partially coated with a hydrophobic coating.

The device may comprise a lower substrate, an upper substrate spaced from the lower substrate, and a fluid barrier provided between the lower substrate and the upper substrate to define a perimeter of the chamber.

The fluid barrier may be provided by an adhesive track that adheres the lower substrate to the upper substrate.

The fluid barrier may be provided by a spacer that spaces the lower substrate from the upper substrate.

At least one of the one or more inlet ports may be provided in the upper substrate of the device. If one or more vents are present, this/they may also be provided in the upper substrate of the chamber.

At least one of the one or more inlet ports and/or the at least one vent may be provided in the fluid barrier. If one or more vents are present, this/they may also be provided in the fluid barrier.

An outer periphery of the spacer may extend beyond an outer periphery of the upper substrate, and at least one of the one or more inlet ports may be defined by respective indentations provided in an internal edge of the spacer. Alternatively, at least one of the one or more inlet ports may be defined by gaps in the spacer. If one or more vents are present, this/they may also be defined by indentations or gaps in the spacer.

The chamber may further comprise a vent area, said vent area in fluid communication with at least one vent and configured to contain the venting fluid.

The chamber may further comprise an active area for carrying out one or more assays.

The device may have at least one vent that is substantially identical to the one or more inlet ports.

The vent area may comprise the active area.

The fluid barrier may further define the vent area and the active area in the chamber.

The device may comprise a flow restriction element for preferentially maintaining the metered volume of the filler fluid in the part of the chamber.

The flow restriction element may comprise a patterned hydrophobic coating on an interior of the chamber.

The flow restriction element (feature) may comprise a constriction in a fluid flow path from the part of the chamber to the vent area.

The flow restriction element may comprise one or more electrically activated barriers between the part of the chamber and the vent, said one or more barriers comprising a fluid immiscible with the filler fluid.

The device may comprise an optical and/or an electric sensor for metering the volume of the filler fluid.

The chamber may comprise at least one vent substantially located in a corner of the part of the chamber.

A fifth aspect of the invention provides a microfluidic system comprising a microfluidic device of the third or fourth aspect, said device contained within a disposable cartridge, and a control and/or reader device configured to control and/or read the microfluidic device.

In a method of the first or second aspect, the filler fluid may comprise a non-polar fluid. It may comprise an oil. It may comprise a surfactant.

In a method of the first or second aspect, the assay fluid may comprise a—polar fluid. It may comprise an aqueous material. It may comprise a surfactant.

In a method of the first or second aspect, the venting fluid may comprise a gas. It may comprise air. It may comprise an inert gas.

CROSS-REFERENCE TO RELATED APPLICATIONS

This Nonprovisional application claims priority under 35 U.S.C. § 119 on Patent Applications Nos. 1516430.4 which is filed in United Kingdom of Great Britain and Northern Ireland on Sep. 16, 2015, the entire contents of which are hereby incorporated by reference.

INDUSTRIAL APPLICABILITY

An AM-EWOD device may be used for a number of digital microfluidic applications such as Point-of-Care (POC) diagnostics, disease detection, RNA testing and biological sample synthesis (e.g. DNA amplification). Mechanisms for sample and reagent loading are an important part of an integrated self-contained disposable system which can be used simply by the operator to carry out such tests. Ease of fluid loading is fundamental to a reliable device.

The invention claimed is:

1. A method of loading a microfluidic device with an assay fluid, the method comprising:

filling a chamber with a filler fluid or with a fluid mixture containing the filler fluid as one component, the chamber having one or more inlet ports and an outlet port for extracting the filler fluid or fluid mixture, wherein as the chamber is filled with the filler fluid or fluid mixture, a venting fluid is vented from a vent area through one or more vents, and the chamber is filled with the filler fluid or fluid mixture in an amount whereby the one or more inlet ports and the one or more vents remain dry of the filler fluid or fluid mixture;

inserting a volume of the assay fluid into one of the one or more inlet ports; and extracting a sufficient amount of the filler fluid or fluid mixture through the outlet port to enable at least some of the volume of the assay fluid to enter the chamber from the one of the one or more inlet ports.

2. A method as claimed in claim 1, wherein the microfluidic device comprises electrodes, and the method further comprises controlling the assay fluid within the chamber by actuation of said electrodes.

3. A method as claimed in claim 2, and comprising controlling the assay fluid within the chamber by actuation of said electrodes during the introduction of the filler fluid and the assay fluid into the chamber.

4. A method as claimed in claim 1 wherein the filler fluid comprises a non-polar fluid, an oil, or a surfactant.

5. A microfluidic device, comprising:

first and second substrates spaced from one another by a spacer and a fluid barrier, the microfluidic device further including side walls and the first substrate being an upper substrate and the second substrate being a lower substrate such that the first and second substrates and the side walls define a chamber therebetween the chamber having one or more inlet ports and at least one vent port for venting a venting fluid from the chamber;

a restriction element that provides a flow restriction that has a tendency to maintain a metered volume of a filler fluid that partially fills the chamber in a part of the chamber; and the restriction element is configured to allow displacement of some of the filler fluid from the part of the chamber when a volume of an assay fluid introduced into one of the one or more inlet ports enters the part of the chamber, thereby causing a volume of the venting fluid to vent from the chamber through the at least one vent port.

6. The microfluidic device of claim 5, wherein the chamber has an outlet port for extracting a filler fluid whereby a volume of an assay fluid introduced into one of the one or more inlet ports is enabled to enter the chamber as a sufficient amount of the filler fluid is extracted through the outlet port.

7. A microfluidic system comprising a microfluidic device as claimed in claim 5, said microfluidic device contained within a disposable cartridge, and a reader device configured to control the microfluidic device.

* * * * *